United States Patent
Cummings

(10) Patent No.: US 12,156,120 B2
(45) Date of Patent: Nov. 26, 2024

(54) USE OF CELL-EDGE FDD COVERAGE TO SEPARATE CELL-CENTER TDD COVERAGE FROM ADJACENT TDD COVERAGE WITH CONFLICTING TDD CONFIGURATION

(71) Applicant: T-Mobile USA, Inc., Bellevue, WA (US)

(72) Inventor: George Cummings, Gilbert, AZ (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 18/517,228

(22) Filed: Nov. 22, 2023

(65) Prior Publication Data
US 2024/0155463 A1 May 9, 2024

Related U.S. Application Data

(63) Continuation of application No. 17/938,415, filed on Oct. 6, 2022, now Pat. No. 11,864,087, which is a continuation of application No. 17/204,654, filed on Mar. 17, 2021, now Pat. No. 11,510,132.

(51) Int. Cl.
*H04W 48/04* (2009.01)
*H04L 5/14* (2006.01)
*H04W 16/24* (2009.01)

(52) U.S. Cl.
CPC ............. *H04W 48/04* (2013.01); *H04L 5/14* (2013.01); *H04W 16/24* (2013.01)

(58) Field of Classification Search
CPC ... H04L 5/1469; H04L 5/0073; H04L 5/0082; H04L 5/14; H04W 16/18; H04W 4/021; H04W 48/04; H04W 16/24
USPC .................................................... 370/280
See application file for complete search history.

(56) References Cited

U.S. PATENT DOCUMENTS

| | | | |
|---|---|---|---|
| 11,128,433 B1* | 9/2021 | Shvodian | H04L 5/0082 |
| 2013/0121189 A1* | 5/2013 | Bhattad | H04L 5/1484 |
| | | | 370/252 |
| 2013/0322308 A1* | 12/2013 | Yu | H04W 28/18 |
| | | | 370/280 |

(Continued)

OTHER PUBLICATIONS

Office Action for U.S. Appl. No. 17/938,415 mailed on May 22, 2023, George Cummings, "Use of Cell-Edge FDD Coverage to Separate Cell-Center TDD Coverage From Adjacent TDD Coverage with Conflicting TDD Configuration", 19 pages.

*Primary Examiner* — Robert J Lopata
(74) *Attorney, Agent, or Firm* — Lee & Hayes, P.C.

(57) ABSTRACT

In a system where a first node provides a first area of TDD coverage on a first TDD carrier using a first TDD configuration and an adjacent second node provides a second area of TDD coverage on a second TDD carrier using a different second TDD configuration, the first node could additionally provide an area of FDD coverage on a first FDD carrier, including causing the area of FDD coverage to sit at least partially between the first and second areas of TDD coverage and therefore to define a spatial buffer between the first and second areas of TDD coverage. For instance, the first access node could restrict its service on the first TDD carrier to be for user equipment devices (UEs) that are relatively close to the first access node and could restrict its service on the first FDD carrier to be for UEs that are relatively far away from the first access node.

17 Claims, 4 Drawing Sheets

(56) References Cited

U.S. PATENT DOCUMENTS

| | | | |
|---|---|---|---|
| 2014/0153454 A1* | 6/2014 | Samdanis | H04W 52/243 |
| | | | 370/280 |
| 2014/0334352 A1* | 11/2014 | Hu | H04W 72/20 |
| | | | 370/280 |
| 2015/0043390 A1* | 2/2015 | Wang | H04W 24/02 |
| | | | 370/280 |
| 2015/0249531 A1* | 9/2015 | Lindoff | H04L 5/14 |
| | | | 370/280 |
| 2016/0014791 A1* | 1/2016 | Liu | H04W 24/08 |
| | | | 370/252 |
| 2016/0302218 A1* | 10/2016 | Behravan | H04W 72/12 |
| 2017/0104572 A1* | 4/2017 | Liu | H04B 7/0408 |
| 2017/0280467 A1* | 9/2017 | Zhu | H04W 72/27 |
| 2017/0290037 A1* | 10/2017 | Goel | H04W 72/56 |
| 2017/0367062 A1* | 12/2017 | Patel | H04W 72/1268 |
| 2021/0112503 A1* | 4/2021 | Zhang | H04W 24/08 |
| 2021/0321416 A1* | 10/2021 | Gaal | H04L 5/1469 |
| 2021/0345352 A1* | 11/2021 | Zhao | H04W 24/02 |
| 2022/0095144 A1* | 3/2022 | Ren | H04W 24/10 |

* cited by examiner

USE OF CELL-EDGE FDD COVERAGE TO SEPARATE CELL-CENTER TDD COVERAGE FROM ADJACENT TDD COVERAGE WITH CONFLICTING TDD CONFIGURATION

REFERENCE TO RELATED APPLICATION

This is a continuation of and claims priority to commonly assigned, co-pending U.S. patent application Ser. No. 17/938,415, filed Oct. 6, 2022, which is a continuation of U.S. patent application Ser. No. 17/204,654, filed Mar. 17, 2021, now U.S. Pat. No. 11,510,132 issued Nov. 20, 2022. Application Ser. Nos. 17/938,415 and 17/204,654 and U.S. Pat. No. 11,510,132 are all fully incorporated herein by reference.

BACKGROUND

A typical cellular wireless network includes a number of access nodes configured to provide wireless coverage areas in which to serve user equipment devices (UEs) such as cell phones, tablet computers, tracking devices, embedded wireless modules, and other wirelessly equipped devices (whether or not user operated). In turn, each access node could sit as a node on a core access network that includes entities such as a network controller and a gateway system providing connectivity with one or more external transport networks such as the Public Switched Telephone Network (PSTN) and/or the Internet. With this arrangement, a UE within coverage of the system could engage in air interface communication with an access node and could thereby communicate via the access node with various remote network entities or with other UEs served by the access node.

Such a network could operate in accordance with a particular radio access technology (RAT), with air-interface communications from the access nodes to UEs defining a downlink or forward link and air-interface communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more carriers, with each carrier spanning one or more radio-frequency (RF) channels for carrying communications wirelessly between the access node and UEs. In particular each carrier could be frequency division duplex (FDD), defining separate frequency channels for downlink and uplink use, or time division duplex (TDD), defining a single frequency channel multiplexed over time between downlink and uplink use.

Each such frequency channel could be characterized by its position and width in RF spectrum, such as by a designated center frequency and bandwidth. Further, each channel could be structured to define various physical resources for carrying communications. For instance, under an example radio access technology, each channel could be divided over time into frames, subframes, timeslots, and symbol segments, and could be divided over frequency into subcarriers. As a result, each channel could define an array of time-frequency resource elements in which subcarriers can be modulated to carry data communications. Further, within each subframe and timeslot, these resource elements could be divided into groups defining physical resource blocks (PRBs) that could be allocated to carry data on an as-needed basis. And certain resource elements may be reserved for other special purposes, such as to carry control channel signaling for instance.

Each carrier could be defined within an industry standard frequency band, by its frequency channel(s) being defined within the frequency band. Examples of such frequency bands include, without limitation, (i) Band 25, which supports FDD carriers and extends from 1850 MHz to 1915 MHz on the uplink and 1930 MHz to 1995 MHz on downlink, (ii) Band 26, which supports FDD carriers and extends from 814 MHz to 849 MHz on the uplink and 859 MHz to 894 MHz on the downlink, (iii) Band 71, which supports FDD carriers and extends from 663 MHz to 698 MHz on the uplink and 617 MHz to 652 MHz on the downlink, (iv) Band 41, which supports TDD carriers and extends from 2496 MHz to 2690 MHz, (v) Band n260, which supports TDD carriers and extends from 27 GHz to 40 GHz, and (vi) Band n261, which supports TDD carriers and extends from 27.5 GHz to 28.35 GHz.

Further, each access node could have a respective antenna structure that is configured to transmit and receive electromagnetic signals on one or more such carriers in a region defined by an antenna pattern or radiation pattern. The antenna pattern could define a geographic scope of coverage in which the access node can engage in downlink transmission to UEs and receive uplink transmission from UEs.

Thus, a coverage area provided by an access node could be characterized in the frequency domain by the coverage area's carrier and in the spatial domain by the coverage area's geographic scope of coverage.

Overview

When an access node's coverage area operates on a TDD carrier, the carrier could be structured with a particular TDD configuration (frame configuration) defining a sequence of equal-duration subframes and establishing which subframes are for downlink use and which subframes are for uplink use. Further, the TDD configuration may designate certain subframes as special subframes that are part downlink and part downlink, to help facilitate transition from downlink to uplink operation. Thus, a representative TDD configuration could establish for each subframe per frame whether the subframe is a downlink subframe (D), an uplink subframe (U), or a special subframe (S).

Various TDD configurations could be feasible. In LTE, for instance, the air interface on a TDD carrier defines a continuum of 10-millisecond frames, each divided into ten 1-millisecond subframes, and LTE defines seven standard TDD configurations as set forth in Table 1.

TABLE 1

| | Subframe Number (0-9) | | | | | | | | | |
|---|---|---|---|---|---|---|---|---|---|---|
| TDD Configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |

TABLE 1-continued

| TDD Configuration | Subframe Number (0-9) | | | | | | | | | |
|---|---|---|---|---|---|---|---|---|---|---|
| | 0 | 1 | 2 | 3 | 4 | 5 | 6 | 7 | 8 | 9 |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Non-standard implementations and/or other radio access technologies may define these or other frame structures and other TDD configurations as well.

In practice, an access node that provides a coverage area on a carrier having any such TDD configuration could broadcast in the coverage area a system information message that specifies the carrier's TDD configuration, so that UEs served by the access node in the coverage area could determine the TDD configuration and operate accordingly. For instance, an access node could broadcast a System Information Block (SIB) message in subframe 0 of each frame and could include in the SIB message a specification of the carrier's TDD configuration, such as a frame configuration (FC) number. Thus, a UE that is within that coverage area of the access node could read that broadcast SIB message to determine the TDD configuration of the coverage area's carrier. Alternatively, a UE might determine the TDD configuration of a carrier in other ways, such as by monitoring to determine the subframes in which the access node transmits per frame.

In an example cellular wireless network, each access node providing coverage on a TDD carrier could be configured to operate with a particular TDD configuration on that carrier. Each such TDD configuration could be statically set by engineering design or the like. Or alternatively, the TDD configuration could be set dynamically to help accommodate varying traffic profiles. For example, at times when an access node serves heavier downlink traffic, the access node may configure the TDD carrier to have a more downlink-centric TDD configuration such as FC2, FC4, or FC5. Whereas, at times when the access node serves heavier uplink traffic, the access node may configure the TDD carrier to have a more uplink-centric TDD configuration such as FC0, FC1, or FC6.

One technological issue with TDD operation is that, if two adjacent access nodes provide spatially overlapping coverage on the same TDD carriers as each other but that use different TDD configurations than each other, interference can occur when there is concurrently downlink communication in one access node's coverage area and uplink communication in the other access node's coverage area.

Disclosed herein is a mechanism that may help to address this issue by having at least one of the access nodes implement a guard zone of FDD coverage spatially between the conflicting TDD coverage areas i.e., to help spatially separate the conflicting TDD coverage areas from each other.

In accordance with the disclosure, when a first access node will provide first TDD coverage on a TDD carrier using a first TDD configuration and a second access node that is spatially adjacent to the first access node will provide second TDD coverage on the same TDD carrier but using a second TDD configuration that is different than the first TDD configuration, at least the first access node will be configured to additionally provide an area of FDD coverage that at least partially sits spatially between the first TDD coverage and the second TDD coverage and thus defines a buffer between those TDD coverage areas.

To do this in practice, the first access node could be configured to provide coverage on both the TDD carrier and an FDD carrier and further to (i) restrict service on the TDD carrier to cell-center UEs, i.e., UEs relatively close to the first access node and (ii) restrict service on the FDD carrier to cell-edge UEs, i.e., UEs relatively distant from the first access node. This way, the first access node could define an outer band of effective FDD coverage that exists spatially beyond the first access node's area of TDD coverage and that sits at least partially between the first access node's TDD coverage and the second access node's TDD coverage.

In addition, the second access node could also be configured similarly to provide a respective are of FDD coverage that at least partially sits between the first TDD coverage and the second TDD coverage and that, cooperatively with the area of FDD coverage provided by the first access node, defines a buffer between the access nodes' TDD coverage areas.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

As noted above, FIG. 1 is a simplified block diagram of an example wireless communication network in which the disclosed principles could be applied. It will be understood, however, that variations from this and other arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by a processing unit executing instructions stored in non-transitory data storage, along with associated circuitry or other hardware, for instance.

Figure 1:
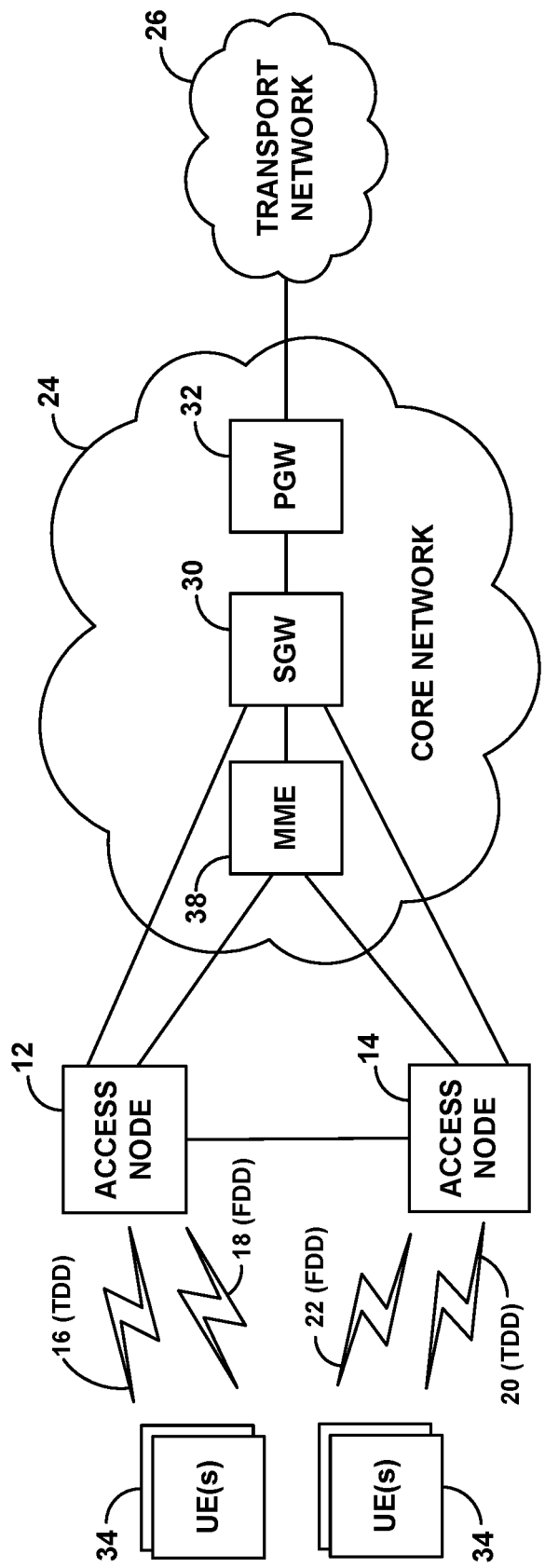
FIG. 1 is a simplified block diagram of a wireless communication network in which the coverage shown in FIG. 1 could be provided.

FIG. 1 depicts two example access nodes 12, 14 included in the example network. These access nodes could be operated by a common wireless service provider. The wireless service provider could thus configure the access nodes for service.

Each access node could be a macro access node, a small cell access node, or other type of access node designed to provide wireless coverage in which to serve user UEs in accordance with one or more defined RATs, and the access nodes could differ in form from each other. Further, in line with the discussion above, each access node could have a respective wireless communication interface, including one or more radios and antenna structures configured to transmit and receive electromagnetic signals so as to provide respective coverage in which to serve UEs.

In the illustrated arrangement, each access node is shown operating respectively on at least two carriers, including a TDD carrier and an FDD carrier. Namely, access node 12 is shown operating on a TDD carrier 16 and an FDD carrier 18, and access node 14 is shown operating operate on a TDD carrier 20 and an FDD carrier 22. In an example implementation, the TDD carriers 16, 20 could be the same as each other, i.e., occupying the same frequency channel as each other. Alternatively, the TDD carriers could be partially the same as each other (e.g., with their frequency channels partially overlapping with each other) or adjacent to each other (e.g., with their frequency channels being adjacent to each other). The FDD carriers 18, 22, on the other hand, may or may not be the same, overlapping, or adjacent to each other in frequency.

The air interface on each of these carriers could be structured as described above, among other possibilities. For instance, the air interface on the frequency channel of each TDD carrier and on the downlink and uplink frequency channels of each FDD carrier, respectively, could be divided over time into frames, subframes, timeslots, and symbol time segments, and over frequency into subcarriers, thus defining an array of air-interface resource elements grouped into PRBs allocable by the access node as noted above, for use to carry data to or from served UEs.

As further shown, access nodes 12, 14 are interconnected with one or more core networks 24, which could provide connectivity with one or more external transport networks 26 such as the Internet for instance. Each such core network could take various forms, examples of which include without limitation an Enhanced Packet Core (EPC) network and a Next Generation Core (NGC) network.

In an example EPC arrangement as shown, the core network includes a mobility management entity (MME) 28, a serving gateway (SGW) 30, and a packet-data-network gateway (PGW) 32, among other nodes. With this arrangement, each access node could have a communication interface with the MME, with the SGW, and with the each other access node, the MME could have a communication interface with the SGW. Further, the SGW could have a communication interface with the PGW, and the PGW could provide connectivity with the transport network 26.

FIG. 1 also illustrates various example UEs 34 that may from time to time be within coverage of the network. These UES could be any of the types noted above, among other possibilities, each including one or more radios and associated logic that enables the UE to be served in accordance with one or more RATs such as one of those noted above for instance.

In line with the discussion above, upon entering into coverage of the network, each such UE could initially scan for coverage and could detect threshold strong coverage of an access node on a given carrier in a given band. For instance, the UE could evaluate reference signal receive power (RSRP) from the access node on the carrier and determine that that RSRP is strong enough to justify connecting. Further, if the UE detects threshold strong coverage of multiple access nodes and/or on multiple carriers, the UE might select the strongest detected coverage on which to connect.

In addition, if the UE is not yet registered for service with the core network 24, the UE could engage in attachment signaling with the MME via the access node. And after authenticating the UE, the MME could responsively coordinate setup of one or more user-plane bearers between the UE and the PGW, including for each a data radio bearer over the air between the access node and the UE and an access bearer through the core network between the access node and the PGW.

Once the UE is connected with the access node on a carrier and is registered for service, the access node could then serve the UE on the carrier, coordinating use of air interface resources such as PRBs to carry data to and from the UE. For instance, when packet data arrives at the core network 24 for transmission to the UE, that packet data could flow over an appropriate bearer to the access node, and the access node could schedule and provide transmission of the packet data to the UE on one or more downlink PRBs of the carrier. And when the UE has packet data to transmit, the UE could transmit a scheduling request to the access node, the access node could direct the UE to transmit the data on one or more uplink PRBs of the carrier, and the UE could accordingly transmit the data on the indicated uplink PRB(s), and the access node could forward the data over an appropriate bearer for output on the transport network 24.

While a UE is served by an access node on a given carrier, the UE may also regularly monitor the UE's coverage strength on that carrier and on other carriers and may provide the access node with measurement reports to enable the access node to adapt its service of the UE based at least on the UE's coverage conditions.

For instance, the UE could periodically, and/or in response to various triggers, measure and report to the access node the UE's RSRP on the carrier on which the UE is connected with the access node and/or on one or more other carriers, and the access node may use these RSRP reports as a basis to control whether to hand over the UE to another access node. For example, if the UE's RSRP from the access node becomes threshold low and the UE detects threshold strong (e.g., threshold stronger) coverage from another access node, the UE's serving access node may coordinate handover of the UE to that other access node.

In line with the discussion above, access nodes 12, 14 could use different TDD configurations than each other on their respective TDD carriers 16, 20. For instance, for coverage on TDD carrier 16, access node 12 may use one of the TDD configurations shown above in Table 1, and for coverage on TDD carrier 20, access node 14 may use a different one of the TDD configurations shown above in Table 1. Alternatively, the TDD configurations used by the access nodes could differ from each other in other ways, perhaps with respect to downlink-uplink sequencing and/or subframe definitions, among other possibilities. Further, as discussed above, each access node could broadcast on its TDD carrier an indication of the TDD configuration of the TDD carrier, and the access node and UEs in coverage of that TDD carrier could operate accordingly.

In the example arrangement, given that these two adjacent access nodes provide respective coverage with different TDD configurations than each other, interference can occur where one access node's TDD coverage is downlink and the other access node's TDD coverage is uplink. Without limitation, an example of such interference could occur at a moment where a UE served by one access node provides uplink transmission on the carrier, and where that uplink transmission interferes with downlink transmission that another nearby UE served by the other access node is attempting to receive. Other examples could exist as well.

Figure 2:
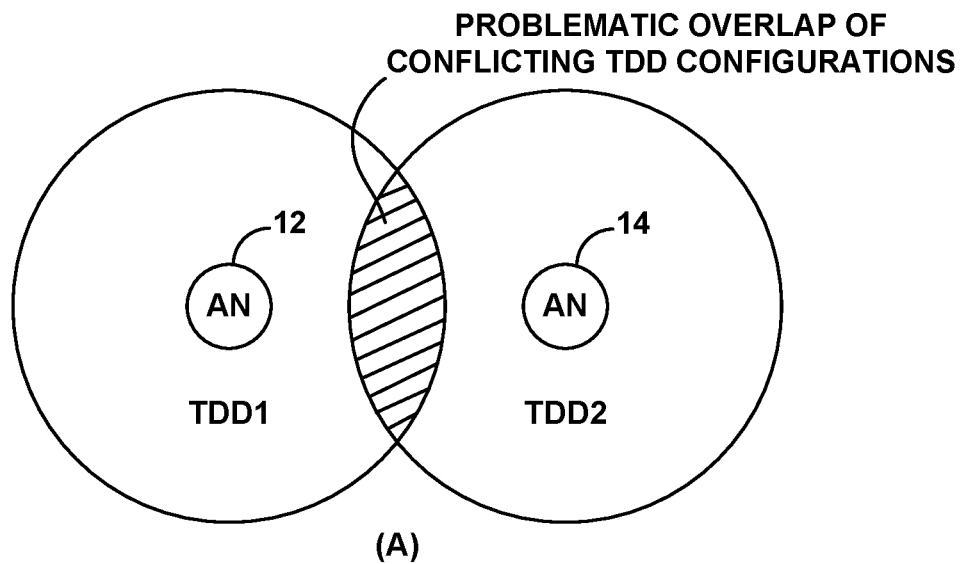
FIG. 2 illustrates two example configurations of TDD coverage areas with conflicting TDD configurations.
Figure 2:
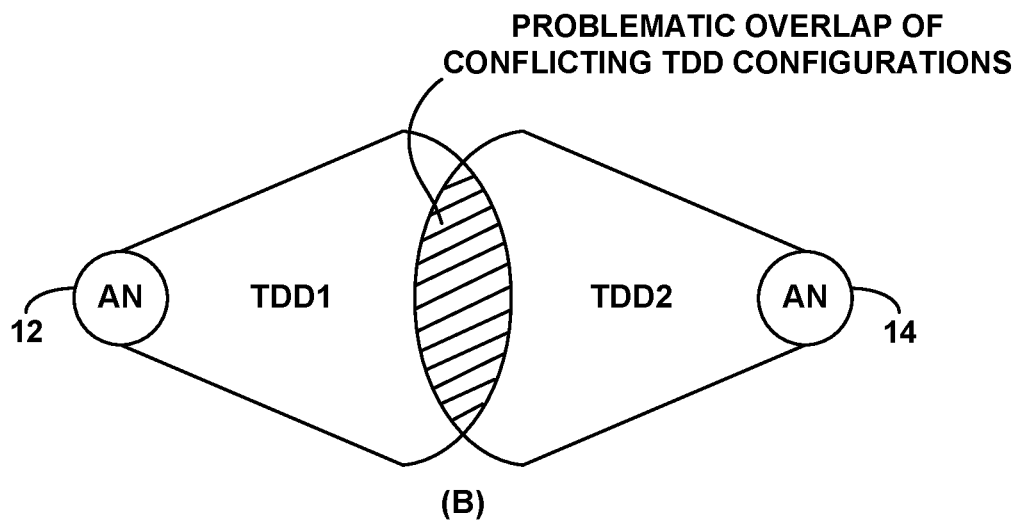

FIG. 2 illustrates two examples of this problematic arrangement. In one example as shown in part A, access node 12 and access node 14 each provide generally omnidirectional coverage on their respective TDD carriers 16, 20, and the TDD coverage of access node 12 overlaps in part with the TDD coverage of access node 14. And in another example as shown in part B, access node 12 and access node 14 each provide more directional coverage on their respective TDD carriers, with each access node's TDD coverage being directed toward the other access node, and with their respective TDD coverage areas overlapping with each other.

As presently contemplated, either or both of these access nodes could be configured to help avoid this spatial overlap of their TDD coverage areas, by introducing an FDD guard zone that sits spatially between the access nodes' respective TDD coverage areas. In particular, one or both of the access nodes could provide an area of FDD coverage that sits at least partially between the two access nodes' areas of TDD coverage, such that this area of FDD coverage effectively defines a buffer between the access nodes' TDD coverage areas.

An access node that provides or contributes to defining this FDD guard zone could optimally do so by limiting service on the access node's TDD carrier to be for UEs that are relatively close to the access node and limiting service on the access node's FDD carrier to be for UEs that are relatively far away from the access node, thus effectively defining an outer spatial band of FDD service—even though the access node's FDD coverage emanates from the access node and may thus technically cover UEs that are relatively close to the access node.

Figure 3:
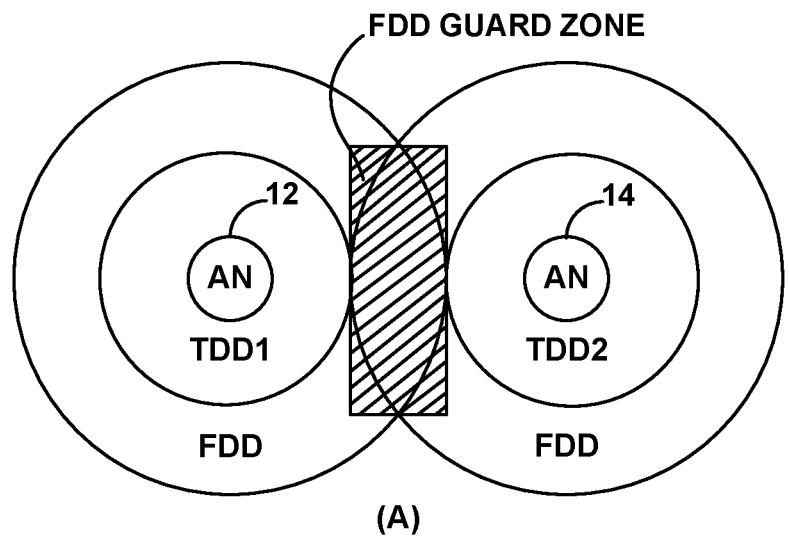
FIG. 3 illustrates examples of how an FDD guard zone could be introduced as a spatial buffer between the conflicting TDD coverage areas of FIG. 2.
Figure 3:
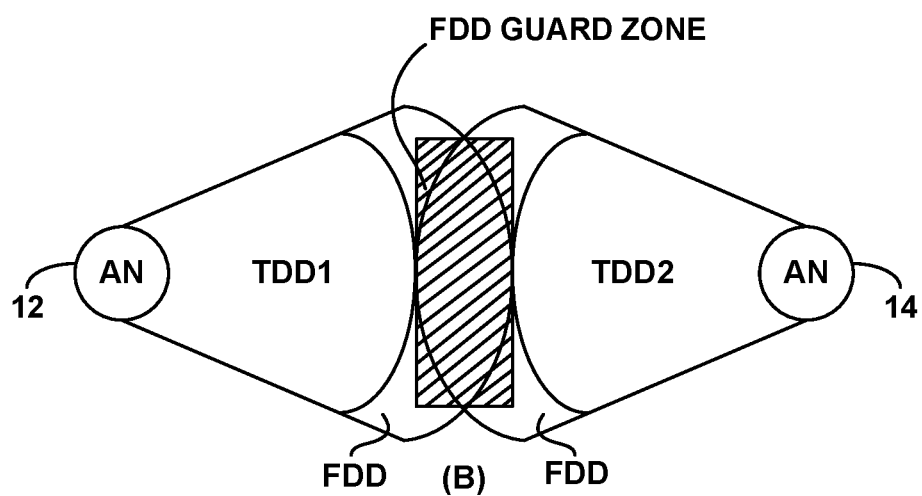

FIG. 3 illustrates some non-limiting examples of how this FDD guard zone could be structured, as variations from the example arrangements of FIG. 2.

As shown in part A of FIG. 3, where each access node provides omnidirectional coverage on both TDD and FDD, each access node could be configured to provide an inner zone of TDD service and an outer zone of FDD service, and the access nodes' zones of FDD service could be configured to overlap with each other and cooperatively to sit at least partially between the access node's respective zones of TDD service. To facilitate this, in practice, each access node could limit service on its TDD carrier to be for UEs that are relatively close to the access node and could limit service on its FDD carrier to be for UEs that are relatively far away from the access node, defining one or more thresholds for "close to" and "far away" in a manner that puts the access nodes' zones of FDD service cooperatively at least partially between the access nodes' zones of TDD coverage.

In an alternative embodiment in this example, just one of the access nodes could provide such an outer zone of FDD service to achieve largely the same effect.

As shown in part B of FIG. 2, where each access node provides more directional coverage on both TDD and FDD, each access node could likewise be configured to provide an inner zone of TDD service and an outer zone of FDD service, and the access nodes' zones of FDD service could be configured to overlap each other and to cooperatively sit at least partially between the two access nodes' respective zones of TDD service. To facilitate this, in practice, each access node could likewise limit service on its TDD carrier to be for UEs that are relatively close to the access node and could limit service on its FDD carrier to be for UEs that are relatively far away from the access node, similarly defining one or more thresholds for "close to" and "far away" in a manner that puts the access node's zone of FDD service at least partially between the two access nodes' zones of TDD coverage.

And here too in an alternative embodiment here, just one of the access nodes could provide such an outer zone of FDD service to achieve largely the same effect.

Note also that an access node's outer zone of FDD service need not itself sit fully between that access node's zone of TDD service and the other access node's zone of TDD service. Rather, as long as the access node's outer zone of FDD service at least partially covers an area that sits between the two access nodes' zones of TDD service, thus acting as a spatial buffer between the access nodes' zones of TDD service, it is also possible that the access node's outer zone of FDD service may overlap to some extent with its or the other access node's zone of TDD service.

Further, while FIG. 2 shows clearly lines of demarcation between an access node's TDD zone of service and the access node's FDD zone of service, the separation of those zones may be less clear in practice.

In an example implementation, an access node could operate in various ways to limit its outer zone of FDD service to be for UEs that are relatively far away from the access node and to limit its inner zone of TDD coverage to be for UEs that are relatively close to the access node.

First, the access node could define the access node's FDD coverage to physically extend farther from the access node than the access node's TDD coverage, so that, as to those two carriers, UEs that are positioned physically farther away from the access node than the range of the access node's TDD coverage could be served by the access node on just the access node's FDD carrier. The access node could so define its FDD coverage to extend farther from the access node than the access node's TDD coverage by broadcasting a higher power reference signal on the access node's FDD carrier than on the access node's TDD carrier and/or by other settings such as having greater antenna downtilt for RF radiation on the TDD carrier than on the FDD carrier. Further, path loss difference between the FDD carrier and TDD carrier could contribute to having the FDD coverage extend farther from the access node than the TDD coverage.

Second, the access node could take into account UE geolocation and/or UE reported coverage strength as a basis to limit the access node's outer zone of FDD service to be for UEs that are relatively far away from the access node and to limit the access node's inner zone of TDD service to be for UEs that are relatively close to the access node.

By way of example, the when a UE is connected with the access node on either carrier, the access node could determine the geolocation of the UE (by using a standard geolocation-determination technique) and could determine whether that geolocation is within the area that is deemed to be the outer zone of FDD service, defined for present purposes for instance, i.e., whether the UE is located at least threshold far away from the first access node. If so, then the access node could cause the UE to be served on the FDD carrier rather than on the TDD carrier; whereas, if not, then the access node could cause the UE to be served on the TDD carrier rather than on the FDD carrier.

With this process, a UE that is close enough to the access node to be within coverage of the access node on both the access node's TDD carrier and the access node's FDD carrier would be restricted to being served on the TDD carrier-even though the UE could just as well be served on the FDD carrier.

Alternatively or additionally, the access node could compare the UE's reported RSRP (or other coverage-strength measure) from the access node with a threshold that is defined by engineering design or otherwise to represent a demarcation between the area that is deemed to be the inner zone of TDD service and the area that is deemed to be the outer zone of FDD service. If the access node determines that the UE's coverage strength is low enough to indicate that the UE is likely far enough away from the access node to be in the area deemed to be the outer zone of FDD service, then the access node could cause the UE to be served on the FDD carrier rather than on the TDD carrier. Whereas, if the access node determines that the UE's coverage strength is high enough to indicate that the UE is likely close enough to the access node to be in the area deemed to be the inner zone of TDD service, then the access node could cause the UE to be served on the TDD carrier rather than on the FDD carrier.

With this process as well, a UE that is in strong enough coverage of the access node on both the access node's TDD carrier and the access node's FDD carrier would be restricted to being served on the TDD carrier—even though the UE could just as well be served on the FDD carrier.

In either of these or other implementations, to cause the UE to be served on a desired one of the carriers rather than on the other carrier, the access node could determine whether the UE is already served by the access node on the desired carrier and could act accordingly. If the access node determines that the UE is already served by the access node on the desired carrier, then the access node could cause the UE to continue being served by the access node on that carrier by not responsively transitioning the UE to be served instead by the access node on the other carrier. Whereas, if the access node determines that the UE is not already served by the access node on the desired carrier, then the access node can cause the UE to transition to be served by the access node instead on the desired carrier, such as by transmitting to the UE an RRC connection-reconfiguration message directing the UE accordingly and updating a context record or the like accordingly, among other possibilities.

Accordingly, the above arrangement and process could facilitate use of conflicting TDD configurations in a wireless communication system in which a first access node provides a first area of TDD coverage on a first TDD carrier using a first TDD configuration and in which a second access node adjacent to the first access node provides a second area of TDD coverage on a second TDD carrier using a second TDD configuration different than the first TDD configuration.

For instance, in that context, the first access node could provide first area of FDD coverage on a first FDD carrier, including causing the first area of FDD coverage to sit at least partially between the first area of TDD coverage and the second area of TDD coverage and therefore to define a spatial buffer between the first area of TDD coverage and the second area of TDD coverage.

In line with the discussion above, the act of the first access node causing the first area of FDD coverage to sit at least partially between the first area of TDD coverage and the second area of TDD coverage could involve (i) restricting service by the first access node on the first TDD carrier to be for UEs that are relatively close to the first access node and (ii) restricting service by the first access node on the first FDD carrier to be for UEs that are relatively far away from the first access node.

Further, as discussed above, the act of restricting service by the first access node on the first FDD carrier to be for UEs that are relatively far away from the first access node could involve (i) determining that a distance of a UE from the first access node is at least as short as a predefined threshold distance and (ii) responsive to the determining, causing the UE to be served by the first access node on the first TDD carrier rather than on the first FDD carrier.

Here, for instance, the process could involve setting the predefined threshold distance at a level that helps to situate the first area of FDD coverage at least partially between the first area of TDD coverage and the second area of TDD coverage. And the act of causing the UE to be served by the first access node on the first TDD carrier rather than on the first FDD carrier could involve (i) if the UE is currently served by the first access node on the first TDD carrier rather than on the first FDD carrier, then continuing to serve the UE on the first TDD carrier, and (ii) if the UE is currently served by the first access node on the first FDD carrier rather than on the first TDD carrier, then transitioning the UE from being served by the first access node on the first FDD carrier to being served instead by the first access node on the first TDD carrier.

Alternatively, as discussed above, the act of restricting service by the first access node on the first FDD carrier to be for UEs that are relatively far away from the first access node could involve (i) determining that coverage strength detected by a UE from the first access node is at least as strong as a predefined threshold coverage strength and (ii) responsive to the determining, causing the UE to be served by the first access node on the first TDD carrier rather than on the first FDD carrier.

And here, the process could likewise involve setting the predefined threshold coverage strength at a level that helps to situate the first area of FDD coverage at least partially between the first area of TDD coverage and the second area of TDD coverage. And the act of causing the UE to be served by the first access node on the first TDD carrier rather than on the first FDD carrier could involve (i) if the UE is currently served by the first access node on the first TDD carrier rather than on the first FDD carrier, then continuing to serve the UE on the first TDD carrier and (ii) if the UE is currently served by the first access node on the first FDD carrier rather than on the first TDD carrier, then transitioning the UE from being served by the first access node on the first FDD carrier to being served instead by the first access node on the first TDD carrier.

Further, as discussed above, the first TDD carrier and second TDD carrier could be the same as each other. That is, the first TDD carrier could define a range of RF spectrum, and the second TDD carrier could define the same range of RF spectrum. Alternatively, the two TDD carriers could just partially overlap with each other in RF spectrum or could be adjacent to each other in RF spectrum or otherwise configured such that there might be some effective overlap.

In addition, as discussed above, the first TDD configuration could define a first sequence of downlink and uplink time intervals, the second TDD configuration could define a second sequence of downlink and uplink time intervals, and the first and second TDD configurations could differ from each other in various ways. For instance, there could be at least one time interval when one of the first and second TDD configurations is downlink and the other of the first and second TDD configurations is uplink.

Still further, as discussed above, the process could additionally involve configuring the second access node to additionally provide a second area of FDD coverage, including causing the second area of FDD coverage to also sit at least partially between the first area of TDD coverage and the second area of TDD coverage and therefore to contribute to defining the spatial buffer between the first area of TDD coverage and the second area of TDD coverage.

Figure 4:
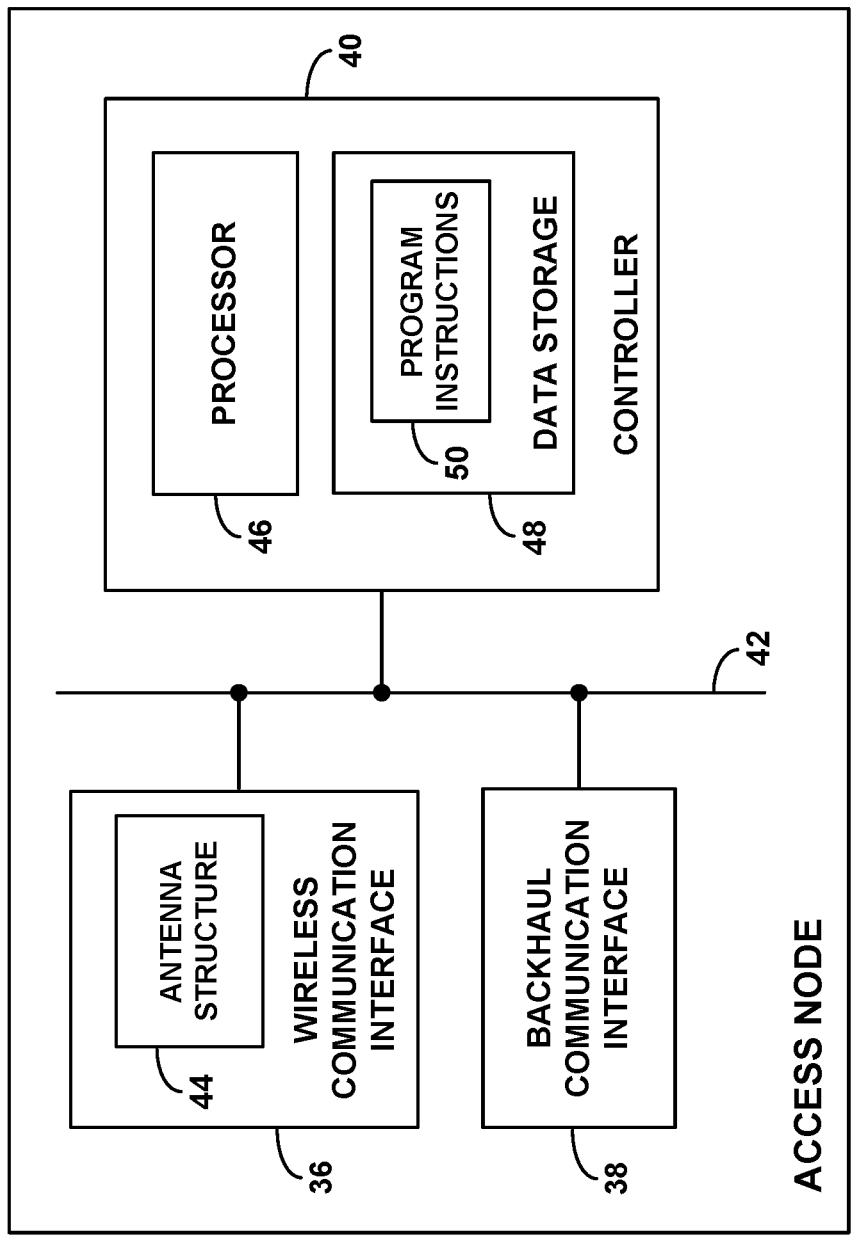
FIG. 4 is a simplified block diagram of an example access node.

FIG. 4 is next a simplified block diagram of an example access node that could be configured to carry out various features described herein. This access node could be one of the access nodes 12, 14, discussed above, among other possibilities.

As shown in FIG. 4, the example access node includes a wireless communication interface 36, a backhaul communication interface 38, and a controller 40, all of which could be integrated together and/or communicatively linked together by a system bus, network, or other connection mechanism 42.

In an example implementation, the wireless communication interface 36 could support air-interface communication and could therefore comprise an antenna structure 44, which could be tower mounted or could take other forms, and associated components such as a power amplifier and a wireless transceiver, so as to facilitate providing coverage and service on a TDD carrier and on an FDD carrier. And the backhaul communication interface 38 could comprise a wired or wireless communication module, such as an Ethernet network communication module and associated logic, through which the access node could engage in backhaul communication with various other network entities.

Further, the controller 40 could be configured to carry out various operations described herein. For instance, as shown, the controller 40 could include at least one processor 46, such as one or more processors (e.g., one or more general purpose processors and/or specialized processors), and a non-transitory data storage 48 (e.g., one or more volatile and/or non-volatile storage components (e.g., magnetic, optical, or flash storage, necessarily non-transitory)) storing program instructions 50 executable by the at least one processor 44 to carry out those operations (e.g., to cause the access node to carry out the operations).

In the process described above, for example, if the depicted access node is the first access node, then, in addition to providing the first area of TDD coverage on the first TDD carrier using the first TDD configuration, the access node could be configured to provide a first area of FDD coverage on a first FDD carrier, including causing the first area of FDD coverage to sit at least partially between the first area of TDD coverage and the second area of TDD coverage and therefore to define a spatial buffer between the first area of TDD coverage and the second area of TDD coverage. And as discussed above, the act of causing the first area of FDD coverage to sit at least partially between the first area of TDD coverage and the second area of TDD coverage could involve (i) restricting service by the first access node on the first TDD carrier to be for user UEs that are relatively close to the first access node and (ii) restricting service by the first access node on the first FDD carrier to be for UEs that are relatively far away from the first access node.

And in the process described above, if the depicted access node is the second access node, then, in addition to providing the second area of TDD coverage on the second TDD carrier using the second TDD configuration different than the first TDD configuration, the access node could be configured to provide a second area of FDD coverage that also sits at least partially between the first area of TDD coverage and the second area of TDD coverage and therefore contributes to defining the spatial buffer between the first area of TDD coverage and the second area of TDD coverage.

Various other features described herein can be carried out in this context as well, and vice versa.

Further, the present disclosure also contemplates a non-transitory computer-readable medium having encoded thereon (e.g., storing, embodying, containing, or otherwise incorporating) program instructions executable to cause a processing unit to carry out operations such as those described above.

Exemplary embodiments have been described above. Those skilled in the art will understand, however, that changes and modifications may be made to these embodiments without departing from the true scope and spirit of the invention.

What is claimed is:

1. A method comprising:
providing by a first access node a time-division-duplex (TDD) coverage area on a TDD carrier;
determining that a second, neighboring access node utilizes a same frequency and different TDD configuration, causing high interference in uplink time slots; and
based at least in part on the determining, providing by the first access node, concurrently with the providing of TDD coverage area, a frequency-division-duplex (FDD) coverage area on an FDD carrier for use by user equipment devices (UEs) in range of the first access node to relieve the high interference.

2. The method of claim 1, further comprising:
subsequently determining that the high interference has ceased or is reduced; and
in response to the subsequently determining, stopping the providing of the FDD coverage area.

3. The method of claim 1, wherein the providing the FDD coverage area includes causing the FDD coverage area to sit at least partially between the TDD coverage area and a coverage area provided by the second, neighboring access node.

4. The method of claim 3, wherein causing the FDD coverage area to sit at least partially between the TDD coverage area and the coverage area provided by the second, neighboring access node comprises (i) restricting service by the first access node on the TDD carrier to be for user equipment devices (UEs) that are relatively close to the first access node and (ii) restricting service by the first access node on the FDD carrier to be for UEs that are relatively far away from the first access node.

5. The method of claim 4, wherein restricting service on the TDD carrier to be for UEs that are relatively close to the first access node and restricting service on the FDD carrier to be for UEs that are relatively far away from the first access node comprises broadcasting a higher power reference signal on the FDD carrier than on the TDD carrier.

6. The method of claim 4, wherein restricting service on the TDD carrier to be for UEs that are relatively close to the first access node and restricting service on the FDD carrier to be for UEs that are relatively far away from the first access node comprises restricting service based on geolocations of UEs or reported coverage strengths at UEs.

7. The method of claim 4, wherein restricting service by the first access node on the FDD carrier to be for UEs that are relatively far away from the first access node comprises:
determining that a distance of a UE from the first access node is at least as short as a predefined threshold distance; and
responsive to the determining, causing the UE to be served by the first access node on the TDD carrier rather than on the FDD carrier.

8. The method of claim 7, further comprising setting the predefined threshold distance at a level that helps to situate the FDD coverage area at least partially between the TDD coverage area and the coverage area provided by the second, neighboring access node.

9. The method of claim 7, wherein causing the UE to be served by the first access node on the TDD carrier rather than on the FDD carrier comprises:
- if the UE is currently served by the first access node on the TDD carrier rather than on the FDD carrier, then continuing to serve the UE on the TDD carrier; and
- if the UE is currently served by the first access node on the FDD carrier rather than on the TDD carrier, then transitioning the UE from being served by the first access node on the FDD carrier to being served instead by the first access node on the TDD carrier.

10. A first access node comprising:
- a wireless communication interface;
- a backhaul communication interface;
- at least one processor;
- program instructions executable by the at least one processor to cause the access node to carry out operations including:
  - determining that a first time-division-duplex (TDD) coverage area of the first access node at least partially overlaps with a second TDD coverage area of a second access node at a threshold distance from the first access node;
  - determining that a first user equipment device (UE) is located greater than the threshold distance from the first access node;
  - determining that a second UE is located less than the threshold distance from the first access node;
  - communicating a set of (FDD) reference signals to an area of partial overlap between the first TDD coverage area and the second TDD coverage area that causes the first UE to communicate with the first access node using FDD; and
  - instructing the second UE to communicate with the first access node using TDD.

11. The first access node of claim 10, wherein the area of partial overlap effectively serves as an FDD guard zone between the first TDD coverage area and the second TDD coverage area.

12. The first access node of claim 10, wherein communicating the FDD reference signals to the area of partial overlap comprises broadcasting higher power reference signals on an FDD carrier than on a TDD carrier used for the first TDD coverage area.

13. The first access node of claim 10, wherein determining that a first UE is located greater than the threshold distance from the first access node comprises determining a geolocation of the first UE or determining reported coverage strengths at the first UE.

14. A non-transitory computer-readable medium having stored thereon instructions executable by at least one processor to cause an access node to carry out operations comprising:
- providing a time-division-duplex (TDD) coverage area on a TDD carrier; and
- providing, concurrently with the providing of TDD coverage area, a frequency-division-duplex (FDD) coverage area on an FDD carrier, including causing the FDD coverage area to sit at least (i) partially between the TDD coverage area and a coverage area provided by a second, neighboring access node or (ii) partially overlapping with the TDD coverage area;
- wherein the causing includes (i) instructing first user equipment devices (UEs) within the FDD coverage area to use the FDD carrier and (ii) instructing second UES within the TDD coverage area but not within the FDD coverage area to use the TDD carrier.

15. The non-transitory computer-readable medium of claim 14, wherein the operations further comprise:
- determining that coverage strength detected by one of the first UEs from the access node is at least as strong as a predefined threshold coverage strength; and
- responsive to the determining, causing the one of the first UEs to be served by the access node on the TDD carrier rather than on the FDD carrier.

16. The non-transitory computer-readable medium of claim 15, wherein the operations additionally include setting the predefined threshold coverage strength at a level that helps to situate the FDD coverage area at least (i) partially between the TDD coverage and the coverage area provided by the second, neighboring access node or (ii) partially overlapping with the TDD coverage area.

17. The non-transitory computer-readable medium of claim 15, wherein causing the one of the first UEs to be served by the access node on the TDD carrier rather than on the FDD carrier comprises:
- if the one of the first UEs is currently served by the access node on the TDD carrier rather than on the FDD carrier, then continuing to serve the one of the first UEs on the TDD carrier; and
- if the one of the first UEs is currently served by the access node on the FDD carrier rather than on the TDD carrier, then transitioning the one of the first UEs from being served by the access node on the FDD carrier to being served instead by the access node on the TDD carrier.

* * * * *